(12) United States Patent
Eliaz et al.

(10) Patent No.: US 9,088,400 B2
(45) Date of Patent: *Jul. 21, 2015

(54) HYPOTHESES GENERATION BASED ON MULTIDIMENSIONAL SLICING

(71) Applicant: MagnaCom Ltd., Moshav Ben Shemen (IL)

(72) Inventors: Amir Eliaz, Moshav Ben Shemen (IL); Ilan Reuven, Ganey Tikva (IL); Gal Pitarasho, Tel Aviv (IL)

(73) Assignee: MagnaCom Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,487

(22) Filed: Aug. 18, 2014

(65) Prior Publication Data
US 2015/0043684 A1    Feb. 12, 2015

Related U.S. Application Data

(63) Continuation of application No. 14/079,304, filed on Nov. 13, 2013, now Pat. No. 8,811,548.

(60) Provisional application No. 61/726,099, filed on Nov. 14, 2012, provisional application No. 61/729,774, (Continued)

(51) Int. Cl.
*H04L 27/06*    (2006.01)
*H04L 1/00*     (2006.01)

(52) U.S. Cl.
CPC .................................. *H04L 1/0054* (2013.01)

(58) Field of Classification Search
CPC ..... H04L 27/38; H04L 27/2649; H04L 25/02; H04L 1/0054; H04L 1/0052

USPC .................................................. 375/341, 343
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |
| 4,797,925 A | 1/1989 | Lin |

(Continued)

FOREIGN PATENT DOCUMENTS

WO    2013030815 A1    3/2013

OTHER PUBLICATIONS

Equalization: The Correction and of Degraded Signals, White Paper, Agilent Technologies, Ransom Stephens V1.0, Aug. 15, 2005 (12 pages).

(Continued)

*Primary Examiner* — Juan A Torres
(74) *Attorney, Agent, or Firm* — McAndrews, Held & Malloy, Ltd.

(57) ABSTRACT

A sequence estimation circuit of a receiver may receive a sample of an inter-symbol correlated (ISC) signal corresponding to a time instant when phase and/or amplitude of the ISC signal is a result of correlation among a plurality of symbols of a transmitted symbol sequence. The sequence estimation circuit may calculate a residual signal value based on the sample of the ISC signal and based on a survivor sequence. The sequence estimation circuit may generate one or more branch vector hypotheses based on the residual signal value, where each of the hypotheses comprises a plurality of symbols. The sequence estimation circuit may generate an estimate of one or more of the plurality of transmitted symbols based on the one or more branch vector hypotheses.

16 Claims, 6 Drawing Sheets

Related U.S. Application Data filed on Nov. 26, 2012, provisional application No. 61/747,132, filed on Dec. 28, 2012, provisional application No. 61/758,532, filed on Jan. 30, 2013, provisional application No. 61/807,813, filed on Apr. 3, 2013.

(56) References Cited

U.S. PATENT DOCUMENTS

| | | | |
|---|---|---|---|
| 5,111,484 A | 5/1992 | Karabinis | |
| 5,131,011 A | 7/1992 | Bergmans et al. | |
| 5,202,903 A | 4/1993 | Okanoue | |
| 5,249,200 A * | 9/1993 | Chen et al. | 375/285 |
| 5,283,813 A | 2/1994 | Shalvi et al. | |
| 5,291,516 A | 3/1994 | Dixon et al. | |
| 5,394,439 A | 2/1995 | Hemmati | |
| 5,432,821 A * | 7/1995 | Polydoros et al. | 375/340 |
| 5,432,822 A | 7/1995 | Kaewell, Jr. | |
| 5,459,762 A | 10/1995 | Wang et al. | |
| 5,590,121 A | 12/1996 | Geigel et al. | |
| 5,602,507 A | 2/1997 | Suzuki | |
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 6,009,120 A | 12/1999 | Nobakht | |
| 6,032,284 A * | 2/2000 | Bliss | 714/792 |
| 6,167,079 A | 12/2000 | Kinnunen et al. | |
| 6,233,290 B1 * | 5/2001 | Raphaeli | 375/341 |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,356,586 B1 | 3/2002 | Krishnamoorthy et al. | |
| 6,516,437 B1 | 2/2003 | Van Stralen et al. | |
| 6,532,256 B2 | 3/2003 | Miller | |
| 6,535,549 B1 | 3/2003 | Scott et al. | |
| 6,690,754 B1 | 2/2004 | Haratsch et al. | |
| 6,697,441 B1 | 2/2004 | Bottomley et al. | |
| 6,785,342 B1 | 8/2004 | Isaksen et al. | |
| 6,871,208 B1 | 3/2005 | Guo et al. | |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 | 3/2007 | Robinson et al. | |
| 7,190,721 B2 | 3/2007 | Garrett | |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,269,205 B2 | 9/2007 | Wang | |
| 7,467,338 B2 | 12/2008 | Saul | |
| 7,702,991 B2 * | 4/2010 | Haratsch | 714/796 |
| 7,830,854 B1 | 11/2010 | Sarkar et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,199,804 B1 | 6/2012 | Cheong | |
| 8,248,975 B2 | 8/2012 | Fujita et al. | |
| 8,351,536 B2 | 1/2013 | Mazet et al. | |
| 8,422,589 B2 | 4/2013 | Golitschek Edler Von Elbwart et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 8,665,941 B1 | 3/2014 | Eliaz | |
| 8,665,992 B1 | 3/2014 | Eliaz | |
| 8,666,000 B2 | 3/2014 | Eliaz | |
| 8,675,769 B1 | 3/2014 | Eliaz | |
| 8,675,782 B2 | 3/2014 | Eliaz | |
| 8,681,889 B2 | 3/2014 | Eliaz | |
| 8,737,458 B2 | 5/2014 | Eliaz | |
| 8,744,003 B2 | 6/2014 | Eliaz | |
| 8,781,008 B2 | 7/2014 | Eliaz | |
| 8,804,879 B1 | 8/2014 | Eliaz | |
| 8,811,548 B2 | 8/2014 | Eliaz | |
| 8,824,572 B2 | 9/2014 | Eliaz | |
| 8,824,599 B1 | 9/2014 | Eliaz | |
| 8,824,611 B2 | 9/2014 | Eliaz | |
| 8,831,124 B2 | 9/2014 | Eliaz | |
| 8,842,778 B2 | 9/2014 | Eliaz | |
| 8,873,612 B1 | 10/2014 | Eliaz | |
| 8,885,698 B2 | 11/2014 | Eliaz | |
| 8,885,786 B2 | 11/2014 | Eliaz | |
| 8,891,701 B1 | 11/2014 | Eliaz | |
| 8,897,387 B1 | 11/2014 | Eliaz | |
| 8,897,405 B2 | 11/2014 | Eliaz | |
| 2001/0008542 A1 | 7/2001 | Wiebke et al. | |
| 2002/0016938 A1 | 2/2002 | Starr | |
| 2002/0123318 A1 | 9/2002 | Lagarrigue | |
| 2002/0150065 A1 | 10/2002 | Ponnekanti | |
| 2002/0150184 A1 | 10/2002 | Hafeez et al. | |
| 2002/0172297 A1 | 11/2002 | Ouchi et al. | |
| 2003/0016741 A1 * | 1/2003 | Sasson et al. | 375/229 |
| 2003/0135809 A1 | 7/2003 | Kim | |
| 2003/0210352 A1 | 11/2003 | Fitzsimmons et al. | |
| 2004/0037374 A1 | 2/2004 | Gonikberg | |
| 2004/0086276 A1 | 5/2004 | Lenosky | |
| 2004/0120409 A1 | 6/2004 | Yasotharan et al. | |
| 2004/0142666 A1 | 7/2004 | Creigh et al. | |
| 2004/0170228 A1 | 9/2004 | Vadde | |
| 2004/0174937 A1 | 9/2004 | Ungerboeck | |
| 2004/0203458 A1 | 10/2004 | Nigra | |
| 2004/0227570 A1 | 11/2004 | Jackson et al. | |
| 2004/0240578 A1 | 12/2004 | Thesling | |
| 2004/0257955 A1 | 12/2004 | Yamanaka | |
| 2005/0047517 A1 | 3/2005 | Georgios et al. | |
| 2005/0123077 A1 | 6/2005 | Kim | |
| 2005/0135472 A1 | 6/2005 | Higashino | |
| 2005/0163252 A1 | 7/2005 | McCallister et al. | |
| 2005/0220218 A1 | 10/2005 | Jensen et al. | |
| 2005/0265470 A1 | 12/2005 | Kishigami et al. | |
| 2005/0276317 A1 | 12/2005 | Jeong et al. | |
| 2006/0067396 A1 | 3/2006 | Christensen | |
| 2006/0109780 A1 | 5/2006 | Fechtel | |
| 2006/0171489 A1 | 8/2006 | Ghosh et al. | |
| 2006/0203943 A1 * | 9/2006 | Scheim et al. | 375/341 |
| 2006/0239339 A1 | 10/2006 | Brown et al. | |
| 2006/0245765 A1 | 11/2006 | Elahmadi et al. | |
| 2006/0280113 A1 | 12/2006 | Huo | |
| 2007/0092017 A1 | 4/2007 | Abedi | |
| 2007/0098059 A1 | 5/2007 | Ives et al. | |
| 2007/0098090 A1 | 5/2007 | Ma et al. | |
| 2007/0098116 A1 | 5/2007 | Kim et al. | |
| 2007/0110177 A1 | 5/2007 | Molander et al. | |
| 2007/0110191 A1 | 5/2007 | Kim et al. | |
| 2007/0127608 A1 | 6/2007 | Scheim et al. | |
| 2007/0140330 A1 | 6/2007 | Allpress et al. | |
| 2007/0189404 A1 | 8/2007 | Baum et al. | |
| 2007/0213087 A1 | 9/2007 | Laroia et al. | |
| 2007/0230593 A1 | 10/2007 | Eliaz et al. | |
| 2007/0258517 A1 | 11/2007 | Rollings et al. | |
| 2007/0291719 A1 | 12/2007 | Demirhan et al. | |
| 2008/0002789 A1 | 1/2008 | Jao et al. | |
| 2008/0049598 A1 | 2/2008 | Ma et al. | |
| 2008/0080644 A1 | 4/2008 | Batruni | |
| 2008/0130716 A1 | 6/2008 | Cho et al. | |
| 2008/0130788 A1 | 6/2008 | Copeland | |
| 2008/0159377 A1 | 7/2008 | Allpress et al. | |

(56) References Cited

U.S. PATENT DOCUMENTS

| | | |
|---|---|---|
| 2008/0207143 A1 | 8/2008 | Skarby et al. |
| 2008/0260985 A1 | 10/2008 | Shirai et al. |
| 2008/0279298 A1* | 11/2008 | Ben-Yishai et al. .......... 375/261 |
| 2008/0279299 A1* | 11/2008 | Reuven et al. ................ 375/267 |
| 2009/0003425 A1 | 1/2009 | Shen et al. |
| 2009/0028234 A1 | 1/2009 | Zhu |
| 2009/0075590 A1 | 3/2009 | Sahinoglu et al. |
| 2009/0086808 A1 | 4/2009 | Liu et al. |
| 2009/0122854 A1 | 5/2009 | Zhu et al. |
| 2009/0185612 A1 | 7/2009 | McKown |
| 2009/0213908 A1 | 8/2009 | Bottomley |
| 2009/0245226 A1 | 10/2009 | Robinson et al. |
| 2009/0290620 A1 | 11/2009 | Tzannes et al. |
| 2009/0323841 A1 | 12/2009 | Clerckx et al. |
| 2010/0002692 A1 | 1/2010 | Bims |
| 2010/0034253 A1 | 2/2010 | Cohen |
| 2010/0039100 A1 | 2/2010 | Sun et al. |
| 2010/0062705 A1 | 3/2010 | Rajkotia et al. |
| 2010/0074349 A1 | 3/2010 | Hyllander et al. |
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0208774 A1 | 8/2010 | Guess et al. |
| 2010/0208832 A1 | 8/2010 | Lee et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0069791 A1 | 3/2011 | He |
| 2011/0074500 A1 | 3/2011 | Bouillet et al. |
| 2011/0074506 A1 | 3/2011 | Kleider et al. |
| 2011/0075745 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0170630 A1 | 7/2011 | Silverman et al. |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0163489 A1 | 6/2012 | Ramakrishnan |
| 2012/0177138 A1 | 7/2012 | Chrabieh et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0077563 A1 | 3/2013 | Kim et al. |
| 2013/0121257 A1 | 5/2013 | He et al. |
| 2013/0343480 A1 | 12/2013 | Eliaz et al. |
| 2013/0343487 A1 | 12/2013 | Eliaz |
| 2014/0036986 A1 | 2/2014 | Eliaz |
| 2014/0056387 A1 | 2/2014 | Asahina |
| 2014/0098841 A2 | 4/2014 | Song et al. |
| 2014/0098907 A1 | 4/2014 | Eliaz |
| 2014/0098915 A1 | 4/2014 | Eliaz |
| 2014/0105267 A1 | 4/2014 | Eliaz |
| 2014/0105268 A1 | 4/2014 | Eliaz |
| 2014/0105332 A1 | 4/2014 | Eliaz |
| 2014/0105334 A1 | 4/2014 | Eliaz |
| 2014/0108892 A1 | 4/2014 | Eliaz |
| 2014/0133540 A1 | 5/2014 | Eliaz |
| 2014/0140388 A1 | 5/2014 | Eliaz |
| 2014/0140446 A1 | 5/2014 | Eliaz |
| 2014/0146911 A1 | 5/2014 | Eliaz |
| 2014/0161158 A1 | 6/2014 | Eliaz |
| 2014/0161170 A1 | 6/2014 | Eliaz |
| 2014/0198255 A1 | 7/2014 | Kegasawa |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

(56) References Cited

OTHER PUBLICATIONS

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

Al-Dhahir, Naofal et al., "MMSE Decision-Feedback Equalizers: Finite-Length Results" IEEE Transactions on Information Theory, vol. 41, No. 4, Jul. 1995.

Cioffi, John M. et al., "MMSE Decision-Feedback Equalizers and Coding—Park I: Equalization Results" IEEE Transactions onCommunications, vol. 43, No. 10, Oct. 1995.

Eyuboglu, M. Vedat et al., "Reduced-State Sequence Estimation with Set Partitioning and Decision Feedback" IEEE Transactions onCommunications, vol. 36, No. 1, Jan. 1988.

\* cited by examiner

HYPOTHESES GENERATION BASED ON MULTIDIMENSIONAL SLICING

PRIORITY CLAIM

This patent application is a continuation of U.S. patent application Ser. No. 14/079,304 filed on Nov. 13, 2013 (now patented as U.S. Pat. No. 8,811,548), which in turn, claims priority to the following application(s), each of which is hereby incorporated herein by reference:

U.S. Provisional Patent Application Ser. No. 61/726,099 titled "Modulation Scheme Based on Partial Response" and filed on Nov. 14, 2012, now expired;

U.S. Provisional Patent Application Ser. No. 61/729,774 titled "Modulation Scheme Based on Partial Response" and filed on Nov. 26, 2012, now expired;

U.S. Provisional Patent Application Ser. No. 61/747,132 titled "Modulation Scheme Based on Partial Response" and filed on Dec. 28, 2012, now expired;

U.S. Provisional Patent Application Ser. No. 61/768,532 titled "High Spectral Efficiency over Non-Linear, AWGN Channels" and filed on Feb. 24, 2013, now expired; and U.S. Provisional Patent Application Ser. No. 61/807,813 titled "High Spectral Efficiency over Non-Linear, AWGN Channels" and filed on Apr. 3, 2013, now expired.

INCORPORATION BY REFERENCE

The entirety of each of the following applications is hereby incorporated herein by reference:

U.S. Pat. No. 8,582,637 titled "Low-Complexity, Highly-Spectrally-Efficient Communications;"

U.S. patent application Ser. No.: 13/754,998, titled "Design and Optimization of Partial Response Pulse Shape Filter," and filed on Jan. 31, 2013;

U.S. Pat. No. 8,675,769 titled "Constellation Map Optimization For Highly Spectrally Efficient Communications;"

U.S. Pat. No. 8,571,131 titled "Dynamic Filter Adjustment for Highly-Spectrally-Efficient Communications;"

U.S. Pat. No. 8,559,494, titled "Timing Synchronization for Reception of Highly-Spectrally-Efficient Communications;"

U.S. Pat. No. 8,559,496, titled "Signal Reception Using Non-Linearity Compensated, Partial Response Feedback;"

U.S. Pat. No. 8,599,914, titled "Feed Forward Equalization for Highly-Spectrally-Efficient Communications;"

U.S. Pat. No. 8,665,941, titled "Decision Feedback Equalizer for Highly-Spectrally-Efficient Communications;"

U.S. Pat. No.: 8,873,612, titled "Decision Feedback Equalizer with Multiple Cores for Highly-Spectrally-Efficient Communications,"

U.S. Pat. No. 8,559,498 titled "Decision Feedback Equalizer Utilizing Symbol Error Rate Biased Adaptation Function for Highly-Spectrally-Efficient Communications;"

U.S. Pat. No. 8,548,097 titled "Coarse Phase Estimation for Highly-Spectrally-Efficient Communications;"

U.S. Pat. No. 8,565,363 titled "Fine Phase Estimation for Highly Spectrally Efficient Communications;"

U.S. Pat. No. 8,744,003 titled "Multi-Mode Transmitter for Highly-Spectrally-Efficient Communications;"

U.S. Pat. No.: 8,605,832, titled "Joint Sequence Estimation of Symbol and Phase with High Tolerance of Nonlinearity,"

U.S. Pat. No. 8,553,821 titled "Adaptive Non-Linear Model for Highly-Spectrally-Efficient Communications;"

U.S. Pat. No.: 8,824,599, titled "Pilot Symbol Aided Sequence Estimation for Highly-Spectrally-Efficient Communications,"

U.S. Pat. No. 8,666,000, titled "Reduced State Sequence Estimation with Soft Decision Outputs;"

U.S. Pat. No. 8,571,146 titled "Method and System for Corrupt Symbol Handling for Providing High Reliability Sequences;"

U.S. Pat. No. 8,566,687 titled "Method and System for Forward Error Correction Decoding with Parity Check for Use in Low Complexity Highly-Spectrally Efficient Communications;

U.S. patent application Ser. No.: 13/755,061, titled "Method and System for Quality of Service (QoS) Awareness in a Single-Channel Communication System," and filed on Jan. 31, 2013;

U.S. Pat. No. 8,665,992, titled "Pilot Symbol Generation for Highly-Spectrally Efficient Communications;"

U.S. Pat. No. 8,548,072 titled "Timing Pilot Generation for Highly-Spectrally Efficient Communications;"

U.S. Pat. No.: 8,824,778, titled "Multi-Mode Receiver for Highly-Spectrally-Efficient Communications,"

U.S. Pat. No. 8,572,458 titled "Forward Error Correction with Parity Check Encoding for Use in Low Complexity Highly-Spectrally Efficient Communications;"

U.S. Pat. No. 8,526,523 titled "Highly-Spectrally-Efficient Receiver;"

U.S. Pat. No. 8,781,008 titled "Highly-Spectrally-Efficient Transmission Using Orthogonal Frequency Division Multiplexing;"

U.S. Pat. No. 8,737,458 titled "Highly-Spectrally-Efficient Reception Using Orthogonal Frequency Division Multiplexing;"

U.S. Pat. No.: 8,831,124 titled "Multi-Mode OFDM Transmitter for Highly-Spectrally-Efficient Communications, "and U.S. Pat. No. 8,681,889 titled "Multi-Mode OFDM Receiver for Highly-Spectrally-Efficient Communications."

TECHNICAL FIELD

Aspects of the present application relate to electronic signal processing. More specifically, to methods and systems for hypotheses generation based on multidimensional slicing.

BACKGROUND

Traditional reduced complexity sequence estimation or trellis algorithms are based on best path search. Survivor paths are selected based on extended path metric calculation for every path candidate. The total number of extended path metrics is the product of the number of survivors and the symbol constellation size (Alphabet consists of M symbols), meaning that every survivor is duplicated M times in order to find the most probable successors (e.g., M-algorithm). Such process exhibits huge amount of complexity in case of large Alphabet size. In the presence of low SNR (close to the cutoff rate), it is required to increase the number of survivors beyond M to assure near ML (Maximum Likelihood) performance.

BRIEF SUMMARY OF THE DISCLOSURE

Methods and systems are provided for hypotheses generation based on multidimensional slicing, substantially as illustrated by and/or described in connection with at least one of the figures, as set forth more completely in the claims.

DETAILED DESCRIPTION

Figure 1:
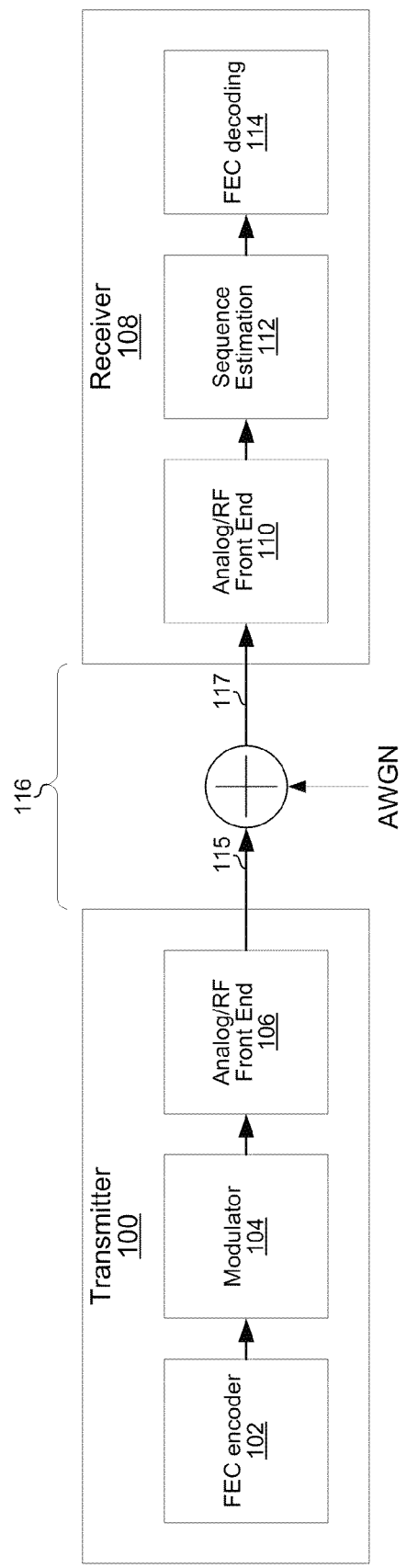
FIG. 1 depicts an example communication system in which signals may be demodulated using multidimensional slicing.

Expression (1) represents the recursive log-likelihood score (metric) function for ML detection:

$$J(\underline{\hat{s}}_{[n]})=J(\underline{\hat{s}}_{[n-1]})-|y_{[n]}-\underline{\hat{a}}_{[n]}^T\cdot\underline{\tilde{h}}|^2, \quad (1)$$

where $y_{[n]}$ represents the sample of the received signal at time instant n. The received signal may be a partial response (PR) signal or may be a signal that was transmitted with near-zero inter-symbol interference (ISI) (e.g., via an root raised cosine (RRC) pulse-shaping filter) but which has ISI as a result of channel effects (e.g., multipath). $\underline{\tilde{h}}$ represents the $N_{\tilde{h}}$ PR filter taps coefficients, $\underline{\tilde{s}}_{[n]}=[\hat{a}_{[n-N_{\tilde{h}}+1]}, \hat{a}_{[n-N_{\tilde{h}}+2]}, \ldots, \hat{a}_{[n]}]$, and each $\hat{a}_{[\,]}$ represents the estimated state of a symbol of the received signal at time instant n. Full state space search such as the Viterbi algorithm is prohibitively complex for a large constellation size A and a long estimated composite response $\underline{\tilde{h}}$. A practical solution will be to use reduced state sequence estimation (RSSE) that processes a sub space of the full state space. One of the most attractive algorithms for sequence estimation (in terms of both cost and performance) is the M-algorithm which maintains M survivor vectors/paths/sequences (vector, path, and sequence are used synonymously in this disclosure) that achieve the largest log-likelihood score $J(\underline{\hat{a}}_{[n]}^{(m)})$, m=1, 2, . . . , M at a given time instant n, where $\underline{\hat{a}}_{[n]}^{(m)}$ is a row vector of the $m^{th}$ survivor sequence of the estimated symbols. For every incoming new sample, each survivor is iteratively extended to M successors with each of the successors comprising a respective one of the M=A constellation symbols in the most-recent symbol location (at index 0). Assuming that the notation (m, k) represents the k-th successor of the m-th survivor path, the branch metrics for M·A successors are calculated by:

$$BM_{[n]}^{(m,k)}=-|y_{[n]}-\underline{\hat{a}}_{[n]}^{(m,k)}\cdot\underline{\tilde{h}}|^2, m=1,2,\ldots,M \text{ and } k=1, 2,\ldots,A. \quad (2)$$

The successor scores are updated with the branch metric:

$$J_{[n]}^{(m,k)}=J_{[n-1]}^{(m,k)}+BM_{[n]}^{(m,k)}, m=1,2,\ldots,M; \text{ and } k=1,2,\ldots,A. \quad (3)$$

The survivors are taken to be the M successors (out of the M·A total successors) with the highest log-likelihood score $J_{[n]}^{(m,k)}$. The M-algorithm may be subject to severe performance degradation around the threshold SNR (cutoff rate) as a result of Correct Path Loss (CPL) events. A CPL event occurs when the successor corresponding to the actual transmitted sequence attains a relatively-low successor score compared to other successors, and is consequently not selected as one of the M survivors for the next iteration. Such an event results in an inevitable error event which could have been avoided in a full-blown ML decoding. It is possible to reduce the CPL event probability by increasing the number of survivors retained for each iteration, but this entails larger complexity, in particular when operating close to the cutoff rate. The CPL event also depends on the magnitude of the first tap coefficient of the composite filter that provides the estimated composite response $\underline{\tilde{h}}$. The magnitude of the first coefficient plays a significant role in the selection of the survivors. This coefficient multiplies the most-recent symbol of the successors and determines the branch metrics of the successors. Thus, in the conventional M-algorithm, the A branch metrics of the A successors generated from the $m^{th}$ survivor differ based only on their respective most-recent symbols. When the first tap coefficient magnitude is relatively small, the information in the new branch is relatively meager, and thus is not reliable, especially for relatively low SNR values. Another drawback of the conventional M-algorithm is that it may be considered cumbersome and not cost effective to perform a search over the entire alphabet size (i.e., to generate, and calculate branch metrics for, all A successors for each of the M survivors), since, given the survivor state and the incoming sample, certain ones of the A possible symbol values are more likely than others.

Aspects of this disclosure, provide for performance (e.g., measured in symbol error rate, bit error rate, and/or the like) that meets or exceeds the conventional M-algorithm with less cost and/or complexity. In this regard, aspects of this disclosure provide a sequence estimation technique that extracts information from the Euclidean space to calculate and compare branch metrics using only the most-likely hypotheses. This approach enables to improve performance and reduce complexity. For each of the M successors generated from the $m^{th}$ survivor, a branch vector hypothesis may be inserted at one or more symbol locations (the "branch locations"), at least one of which may be associated with a relatively large (perhaps largest) one of the coefficients $\underline{p}$, where $\underline{p}$ is the vector (of length $N_p$) of filter tap coefficients of a filter corresponding the estimated composite response $\underline{\tilde{h}}$. In this manner, the CPL probability may be significantly reduced relative to the conventional M-algorithm in which the branch locations consist only of the most-recent symbol location, which is associated with the first of the coefficients $\underline{p}$ (which is typically relatively-small for spectral mask compliance).

FIG. 1 depicts an example communication system in which signals may be demodulated using multidimensional slicing. Shown are a transmitter 100 and a receiver 108 which communicate over a channel that introduces noise which may be adequately modeled as additive white Gaussian noise (AWGN).

Shown in the transmitter 100 are a forward error correction (FEC) encoder 102, a modulator 104, and an analog/RF front-end 106. The encoder 102, modulator 104, and front-end 106 may, for example, be integrated on one or more semiconductor dies (e.g., 102 and 104 may be part of a baseband processor integrated circuit (IC) and the front-end 106 may comprise discrete components and/or a second IC). In various example implementations, the transmitter 100 may be similar to, or the same as, the transmitters described in one or more of the above-incorporated patents and applications (e.g., transmitter 120 of U.S. patent application Ser. No. 13/922,329), but may differ in operation or configuration from such transmitters where necessary to implement aspects of this disclosure.

In an example implementation, the transmitter 100 may use a linear modulation scheme such as Pulse Amplitude Modulation (PAM) or Quadrature Amplitude Modulation (QAM) usually with a zero-ISI (Inter-symbol Interference) pulse shaping filter. That is, the pulse shaping filter (e.g., in front end 106) may take on a zero value at any integer multiple of the symbol period, t=nT, where n in an integer and T is the symbol period (except for n=0). Zero-ISI signals are generated by filters that obey the so-called Nyquist's Second Criterion, for example, a raised-cosine filter.

In another example implementation, the transmitter 100 may use a linear modulation scheme along with partial response pulse shaping that introduces correlation between successive symbols. Such a filter does not introduce nulls at time instants which are integer multiples of the symbol period. The transmit signal generated by such a filter intentionally has a substantial amount of ISI. The ISI is therefore a controlled ISI. A partial response signal is just one example of a type of signal for which there is correlation among symbols of the signal (referred to herein as "inter-symbol-correlated (ISC) signals"). Accordingly, in still other example implementations, the transmitter 100 may transmit other ISC signals such as, for example, signals generated via matrix multiplication (e.g., lattice coding), signals generated via decimation as in multi-carrier applications such as in OFDM systems, and signals corrupted by some nonlinear distortion such as phase noise and amplifier compression.

Shown in the receiver 108 are an analog/RF front-end 110, a sequence estimation circuit 112, and an FEC decoding circuit 114. The analog/RF front-end 110, a sequence estimation circuit 112, and an FEC decoding circuit 114 may, for example, be integrated on one or more semiconductor dies (e.g., 112 and 114 may be part of a baseband processor integrated circuit (IC) and the front-end 110 may comprise discrete components and/or a second IC). In various example implementations, the receiver 108 may be similar to, or the same as, the receiver described in one or more of the above-incorporated patents and applications (e.g., receiver 130 of U.S. patent application Ser. No. 13/922,329), but may differ in operation or configuration from such receivers where necessary to implement aspects of this disclosure.

First considering the case where the AWGN is negligible, any modulated sample, $y_{[n]}$, of signal 117 received by receiver 108 can be represented by an inner product between a sequence of symbols $a^T$ transmitted by transmitter 100, and the coefficients $\underline{p}$ of the composite filter that models the composite response of the front-end 106, the channel 116, and the front-end 110. This inner product can be expressed as $y=\underline{a}^T \cdot \underline{p}$ and may be considered as a point of an $N_p$-dimensional lattice (a "partial lattice"). This inner product may be represented by two contributions: $\underline{a}_1^T \cdot \underline{p}_1$ and $\underline{a}_2^T \cdot \underline{p}_2$ (i.e., $\underline{a}^T \cdot \underline{p} = \underline{a}_1^T \cdot \underline{p}_1 + \underline{a}_2^T \cdot \underline{p}_2$). Thus, $\underline{a}_2^T \cdot \underline{p}_2 = y - \underline{a}_1^T \cdot \underline{p}_1$, may be considered as a partial, $N_2$-dimensional lattice slicing problem, where $N_2$ stands for the length of $\underline{p}_2$, $\underline{a}_2$ consists of $N_2$ symbols, and $N_2 < N_p$. Assuming that $\underline{a}_1^T \cdot \underline{p}_1$ is known, it is possible to generate a hypothesis for the branch vector $\underline{a}_2$ (a branch vector hypothesis is denoted $\hat{\underline{a}}_2$) based on the partial lattice point $D_x = y - \underline{a}_1^T \cdot \underline{p}_1$ using a multidimensional slicing. The slicing may be performed by the sequence estimation circuit 112 using a look-up table populated based on the known response $\underline{p}_2$ (i.e., $\hat{\underline{a}}_2 = LUT\{D_x\}$). The look-up table represents the partial lattice generated by the response $\underline{p}_2$ and, in an example implementation for an ideal channel, there may be a one-to-one mapping between partial lattice points $D_x$ and branch vector hypotheses $\hat{\underline{a}}_2$.

Now considering the case where the AWGN is not negligible, each sample of the received signal 117 is given by $r = y + \eta$, where $\eta$ represents the AWGN, and may correspond to a residual signal value $D_r = r - \underline{a}_1^T \cdot \underline{p}_1$. As a result of the noise, the residual signal value $D_r$ may be off the partial lattice (i.e., not coincide with any of the partial lattice points $D_x$). Consequently, the hypotheses $\hat{\underline{a}}_2^{(1)}$ corresponding to the ML solution based on a single received sample r is the partial lattice point $D_x$ that is closest to residual signal value $D_r$. Additional branch vector hypotheses (denoted $\hat{\underline{a}}_2^{(k)}$, k=2, 3, . . . Q) corresponding to the Q−1 partial lattice points $D_x$ that are next-closest to the residual signal value $D_r$ may also be determined from the slicing. That is, rather than a one-to-one mapping, any particular residual signal value $D_r$ may be mapped to Q hypotheses of the branch vector $\underline{a}_2$ (denoted $\hat{\underline{a}}_2^{(k)}$, k=1, 2, 3, . . . Q) per survivor. The hypotheses can be used as an alternative to the exhaustive search performed by the M-algorithm. The hypotheses have depth of $N_2$ rather than depth of 1 as in the conventional M-algorithm. In an example implementation, the branch vector hypotheses may be inserted into the successors at the branch locations which have indexes of $[N_2+1, N_2+2, \ldots 1, n]$. Consequently, the hypotheses for a current iteration may overwrite symbols of one or more hypotheses from one or more previous iterations. Thus, the successors of the $m^{th}$ survivor may comprise: (1) survivor symbols in locations which have indexes of $[N_p+1, N_p+2, \ldots N_2]$, and (2) branch symbols in locations which have indexes of $[N_2+1, N_2+2, \ldots 1, n]$. By generating successors in this way it is possible to recover from a CPL event.

The generation of branch vector hypotheses may be considered as a multidimensional slicing. This slicing is based on the response $\underline{p}_2$ that may be selected to incorporate the tap coefficients with relatively-high (perhaps the highest) magnitude in order to improve the reliability of the slicing compared to the search carried out by the M-algorithm. In an example implementation, the algorithm may be formulated as follows: Assuming that at time instant n−1, the $m^{th}$ survivor is $\hat{\underline{a}}_{[n-1]}^{(m)} = [\hat{a}_{[n-N_h]}^{(m)}, \hat{a}_{[n-N_h+1]}^{(m)}, \ldots, \hat{a}_{[n-1]}^{(m)}]$, then the $k^{th}$ successor of the $m^{th}$ survivor at time instant n may be represented as:

$$\hat{\underline{a}}_{[n]}^{(m,k)} = [\hat{a}_{[n-N_h+1]}^{(m)}, \hat{a}_{[n-N_h+2]}^{(m)}, \ldots, \hat{a}_{[n-N_2]}^{(m)}, \hat{a}_{[n-N_2+1]}^{(m,k)}, \ldots, \hat{a}_{[n]}^{(m,k)}], \quad (4)$$

m=1, 2, . . . , M; and k=1, 2, . . . , Q

The $N_2$ branch symbols of the $k^{th}$ successor (i.e., the $k^{th}$ hypothesis) for the $m^{th}$ survivor may then be represented as:

$$\hat{\underline{a}}_{2[n]}^{(m,k)} \triangleq [\hat{a}_{[n-N_2+1]}^{(m,k)}, \ldots, \hat{a}_{[n]}^{(m,k)}] \quad (5)$$

Assuming that $\hat{\underline{a}}_{1[n]}^{(m,k)} = \hat{\underline{a}}_{1[n]}^{(m)} \triangleq [\hat{a}_{[n-N_h+1]}^{(m)}, \hat{a}_{[n-N_h+2]}^{(m)}, \ldots, \hat{a}_{[n-N_2]}^{(m)}]$ is the known reference sequence of the survivor symbols, we can represent the $1^{st}$ hypothesis of the $m^{th}$ survivor as:

$$\hat{\underline{a}}_{2[n]}^{(m,1)} \triangleq \underset{\hat{\underline{a}}_2}{\operatorname{argmin}} \{|r_{[n]} - \hat{\underline{a}}_{1[n]}^{(m)} \cdot \tilde{h}_1 - \hat{\underline{a}}_2 \cdot \tilde{h}_2|^2\}, \quad (6)$$

the $2^{nd}$ hypothesis for the $m^{th}$ survivor as:

$$\hat{\underline{a}}_{2[n]}^{(m,2)} \triangleq \underset{\hat{\underline{a}}_2}{\operatorname{argmin}} \{|r_{[n]} - \hat{\underline{a}}_{1[n]}^{(m)} \cdot \tilde{h}_1 - \hat{\underline{a}}_2 \cdot \tilde{h}_2|^2 : \hat{a}_{2[n]}^{(m,2)} \neq \hat{a}_{2[n]}^{(m,1)}\}, \quad (7)$$

and, in general, the $k^{th}$ hypothesis for the $m^{th}$ survivor as:

$$\hat{\underline{a}}_{2[n]}^{(m,k)} \triangleq \underset{\hat{\underline{a}}_2}{\text{argmin}} \{|r_{[n]} - \hat{\underline{a}}_{1[n]}^{(m)} \cdot \underline{\tilde{h}}_1 - \hat{\underline{a}}_2 \cdot \underline{\tilde{h}}_2|^2 : \hat{\underline{a}}_{2[n]}^{(m,k)} \neq \hat{\underline{a}}_{2[n]}^{(m,q)} \forall \, 0 < q < k\}, \quad (8)$$

where $\underline{\tilde{h}} = [\underline{\tilde{h}}_1 \, \underline{\tilde{h}}_2]$ represents the decomposition of the composite response to the partial lattice structure, and argmin $\hat{\underline{a}}_2\{F(\hat{\underline{a}}_2)\}$ is the value of $\hat{\underline{a}}_2$ that minimizes the expression $F(\hat{\underline{a}}_2)$. The tap coefficients of $\underline{\tilde{h}}$ are represented in this disclosure as $\tilde{h}_x$, for $1 \leq x \leq N_p$. For relatively small values of $N_2$ (e.g., less than 10), the set of hypotheses $\hat{\underline{a}}_{2[n]}^{(m,k)}$, k=1, 2, ..., Q may be extracted with low complexity by a look-up table built according to the partial response $\underline{\tilde{h}}_2$. This table uses as its input the residual signal value $r_{[n]} - \hat{\underline{a}}_{1[n]}^{(m)} \cdot \underline{\tilde{h}}_1$. For reference, when $N_2 = N_{\tilde{h}}$, and $Q = AN_{\tilde{h}} - 1$, then the proposed method coincides with the full state space ML search.

As discussed above, in typical reduced complexity sequence estimation algorithms, a single symbol branch vector (e.g., inserted at index 0 of the successors) is used for branch metric calculation. This typically results in branch metrics that are unreliable due to the low amplitude of the tap coefficient associated with the single branch location. Using a two symbol branch vector (e.g., inserted at indexes 1 and 0 of the successors) is much more reliable because of the higher magnitude of the tap coefficient associated with the second branch location (e.g., the tap coefficient associated with index 1). The reliability, however, comes at the price of much more complexity. For example in the case of M-algorithm, calculating branch metrics for two branch symbols will require $M^3$ branch metric calculations ($M^2$ branch metrics for each of M survivors) instead of $M^2$ branch metric calculations (M branch metrics for each of the M survivors) for the single branch symbol case. Thus, complexity of the Look-Up Table (LUT) grows exponentially with increase in number of branch symbols. Conversely, complexity of the LUT increases only linearly with increase in number of branch symbols when using the partial (multidimensional) lattice slicing approach described herein.

Figure 2:
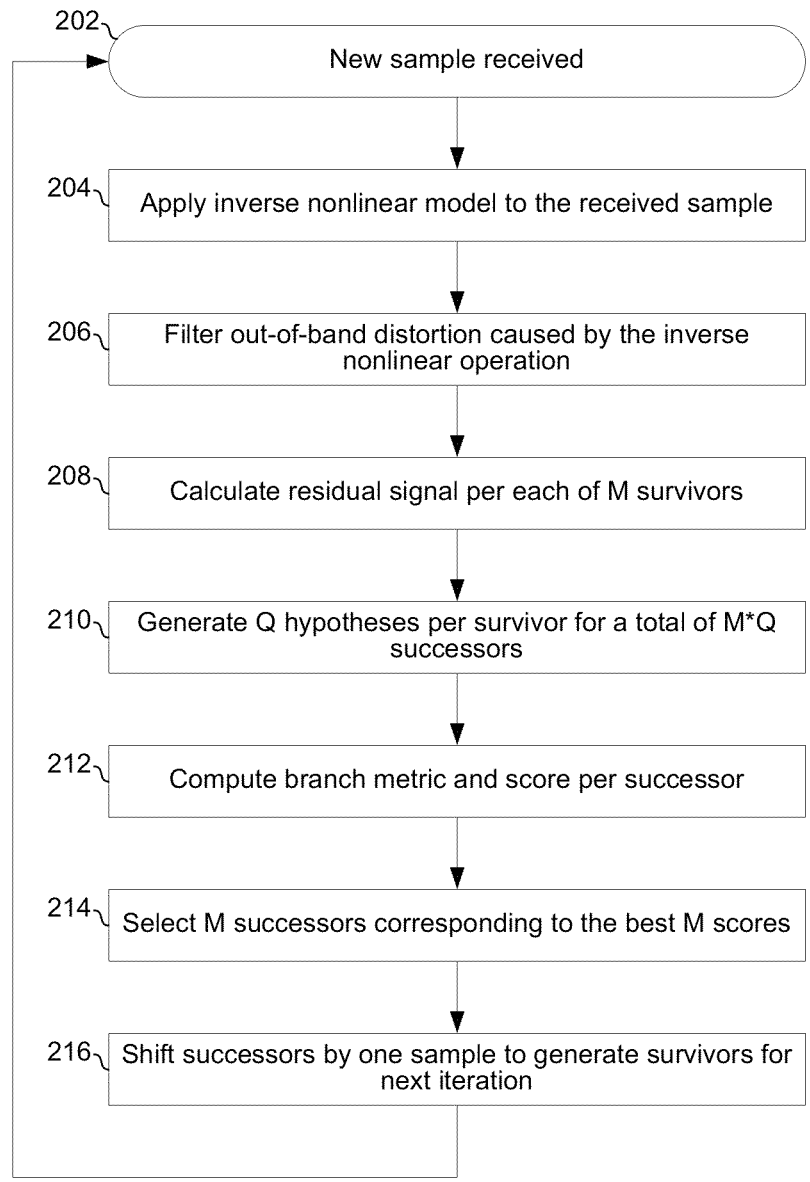
FIG. 2 is a flowchart depicting an example method for partial (multidimensional) slicing to generate the most probable hypotheses for high performance/low complexity sequence estimation.

The flowchart in FIG. 2 depicts an example method for partial (multidimensional) slicing for generating the most-probable branch vector hypotheses for high performance/low complexity sequence estimation.

In block 202, a new sample, $r_{[n]}$, of a modulated signal is received.

In block 204, an inverse nonlinear function is operated on the received sample $r_{[n]}$. The inverse nonlinear function may be an approximation of the inverse of a nonlinearity experienced by the modulated signal through the transmitter 100, channel 116, and/or receiver front end 110. The inverse nonlinear function may be adapted dynamically at the receiver for variations caused by, for example, a change of environmental conditions (e.g., temperature, power supply, etc.) and power level that may affect the nonlinear distortion level.

In block 206, the signal resulting from the operation of the inverse nonlinear function is filtered using an LPF (Low-Pass Filter) to reject out-of-band components that may be generated by the inverse nonlinear operation. In case that the nonlinear distortion is small comparing to the received signal-to-noise ratio (SNR), the blocks 204 and 206 may be bypassed.

In block 208, the residual signal value is calculated per survivor according to the term $LPF\{f_{NL}^{-1}(r_{[n]})\} - \hat{\underline{a}}_{1[n]}^{(m)} \cdot \underline{\tilde{h}}_1$, where $\hat{\underline{a}}_{1[n]}^{(m)}$ represents $N - N_2$ symbols of the $m^{th}$ survivor at time instant n, and $LPF\{f_{NL}^{-1}(r_{[n]})\}$ represents the filtered inverse nonlinear signal.

In block 210, the resulting M residual signal values are used to generate Q hypotheses per survivor. Each hypothesis may consist of $N_2$ branch symbols that may override $N_2 - 1$ branch symbols of the survivor of the previous iteration. The hypothesis generation may be realized by a LUT or by arithmetic circuit.

In block 212, for each one of the M·Q successors, a branch metric is computed and accumulated with that successor's path score from the previous iteration to arrive at an updated path score.

In block 214, the M paths having the highest M updated path scores are selected to be the new survivors for the next iteration.

In block 216, the survivors are shifted one symbol. That is, the symbol at index $N_p$ shifts out of the tail of the survivor, the symbol at index $N_p + 1$ shifts to index $N_p$, the symbol at index $N_p + 2$ shifts to index $N_p + 1$, and so on down to the symbol at index 0 shifting to index 1 such that the location at index 0 is ready for the next sample. The process then returns to block 202 in which that next sample is received.

The partial lattice corresponds to a subset of the taps of the PR filter, and thus they take part in the overall PR filter characteristics of the modulation such as spectrum response, susceptibility for nonlinear distortion, Symbol-Error-Rate (SER), Bit-Error-Rate (BER) and the resulting most probable error patterns (e.g., as described, for example, in the above-incorporated U.S. patent application Ser. Nos. 13/754,998 and 13/755,026). Therefore, the construction of the partial lattice may be combined with the design of the PR filter while the partial lattice considerations affects the ratios among the first $N_2$ taps of the PR filter. Considering the design of the partial lattice taps apart of the full PR filter, the construction of the partial lattice can be determined according to the following objectives:

Complexity: Regular partial lattice will enable low complexity slicing to provide the respective $N_2$ symbols for a hypothesis. A symmetrical lattice may be used to decouple I-Q and relax slicing complexity.

Performance: To maximize the minimal Euclidean distance ($d_{min}$) between adjacent partial lattice points which increase the slicing reliability under high signal-to-noise (SNR) ratio and potentially nonlinear distortions.

Comply with the transmit spectrum mask limitation (e.g., spectral mask set forth by FCC or ETSI).

Figure 3:
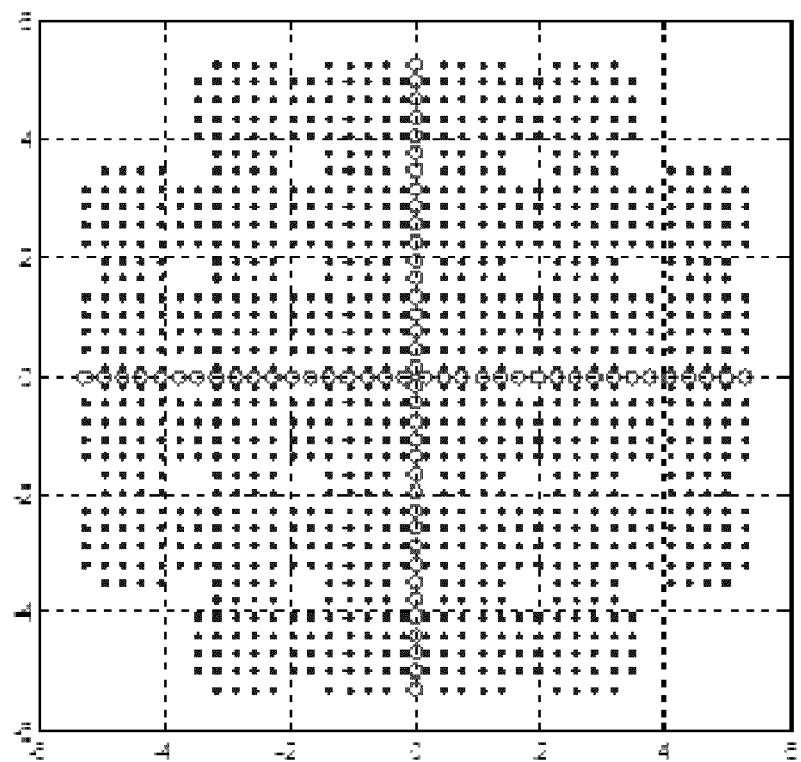
FIG. 3 shows an example two-dimensional lattice ($N_2=2$) for QAM-32.

The above objectives may be in conflict and a constrained optimization is needed. As an example, FIG. 3 shows a two dimensional lattice ($N_2 = 2$) for QAM-32 which may be optimal for certain implementations of this disclosure. The first and second tap values are $\tilde{h}_1 = 0.15$; $\tilde{h}_2 = 0.9$, respectively (having a ratio $\tilde{h}_1 / \tilde{h}_2 = 6$). This example is optimized for maximizing the minimal Euclidean distance (dmin) which is constant for all of the lattice points except for 25 square spaces reflecting the non-square QAM-32 scheme constructed by a grid of $\{\pm 1, \pm 3, \pm 5\}$.

Figure 4:
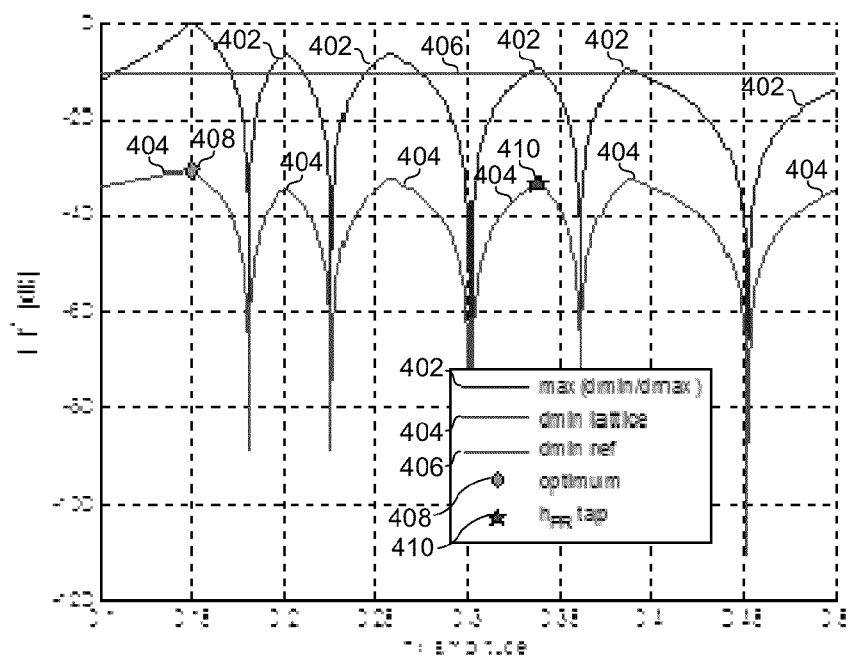
FIG. 4 illustrates the Euclidean distance of the lattice of FIG. 3 as a function of $\tilde{h}_1$ for $\tilde{h}_2=0.9$.

FIG. 4 delineates the Euclidean distance of the lattice as a function of $\tilde{h}_1$ for $\underline{\tilde{h}}_2 = 0.9$. The curve 404 represents $d_{min}$ and the curve 402 represents the ratio between the maximal and the minimal distance across the lattice. The optimal lattice for $d_{min}$ is obtained $\tilde{h}_1$ for $=0.15$ (called out as 408) which is the case that is described in the figure above. However, this solution does not necessarily comply with transmission spectral mask limitation determined by the spectrum of the PR filter and an alternative lattice structure should be considered. In this case, it is suggested to use one of the local optima such as $\tilde{h}_1 = 0.338$ (called out as 410). Curve 406 is a reference for $d_{min}$.

Figure 5:
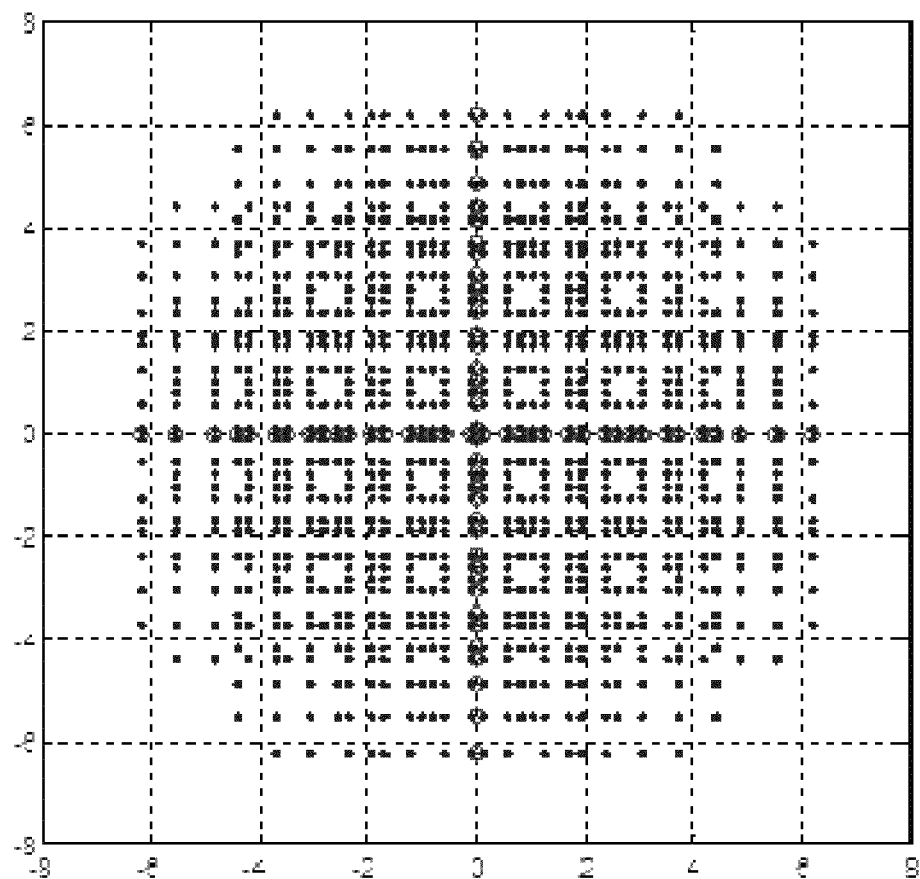
FIG. 5 shows an example two-dimensional lattice ($N_2=2$) for QAM-32.

FIG. 5 depicts the lattice when using the local optimum of $\tilde{h}_1=0.338$ (shown in FIG. 4).

Figure 6:
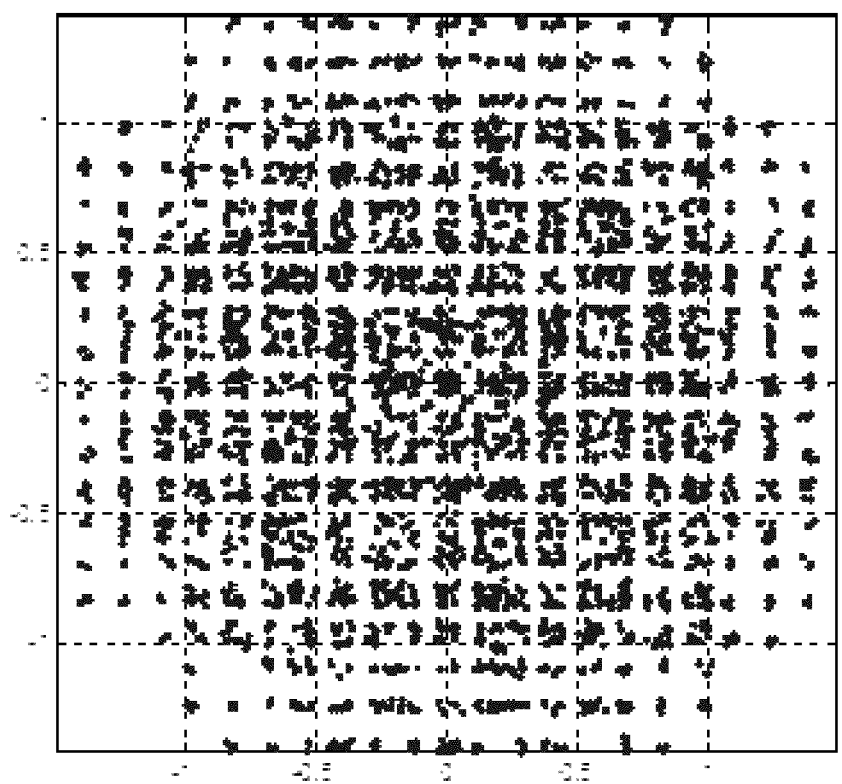
FIG. 6 illustrates simulation results for residual signal values in which the transmitted signal was an ISC signal in the presence of noise and the partial lattice used was the lattice of FIG. 5.

FIG. 6 illustrates simulation results for residual signal values in which the transmitted signal was an ISC signal in the presence of noise and the partial lattice used was characterized by $\tilde{h}_1=0.338$; $\tilde{h}_2=0.9$.

We now consider a system with nonlinear distortion that affects the modulated signal. In that case, the signal can no longer be represented by a linear decomposition, such as is described above. Accordingly, an inverse estimation of the nonlinear model may be used on the received signal prior to the partial slicing. The nonlinear inverse will attempt to cancel the nonlinear distortion and will enable correct linear decomposition. The nonlinear inverse operation may enhance AWGN that distorts the received signal which may increase the distance of the correct hypothesis from the residual signal that may result in a CPL event caused by the limited coverage of the limited number of hypotheses. The partial slicing may tolerate that by increasing the number of hypotheses used per survivor.

The inverse nonlinear operation may result in spectral regrowth that produces out-of-band spectral components which are not present in the received signal due to filtering in the receiver (e.g., bandpass filter (BPF) at the RF font-end, analog lowpass filter (LPF) at the I-Q baseband, digital filters in the demodulator). Therefore a LPF may be used following the nonlinear inverse operation to improve the effectiveness of the partial slicing and hypotheses generation.

Assuming use of a suboptimal partial lattice such as depicted in FIG. 5, it is easy to notice that inner points are congested at the center of the lattice and become sparser at the boundaries. Consequently, the same number of hypotheses that are used at a point near the boundaries may occupy much larger volume compared to a point close to the center. Since detection is more reliable when hypotheses occupy large volume, in an example implementation, this behavior can be used to reduce complexity by using a different number of hypotheses which is related to the density (e.g., per volume unit) of points to maintain similar volume coverage over the lattice. In such an implementation, when the residual signal value is near one or more boundaries of the lattice, a smaller number of hypotheses may be used, and a larger number of hypotheses may be used when the residual signal value is closer to the center of the partial lattice. The reliability of the estimation based on the density of the lattice points described above may be used in the derivation of the soft output of the sequence estimation circuit 112 (e.g., bit Log-Likelihood Ratio—LLR) that feed a soft-input FEC decoder 114. That is, the LLRs may be weighted according to the associated location of the residual lattice point.

As was described above, iteration at time instant n provides Q hypotheses per survivor. In an example implementation, each of the hypotheses consists of $N_2$ symbols that may override the first $N_2-1$ symbols of the survivors from the iteration at time instant n−1. The symbol index $N_2$ of each the survivors from the iteration at time instant n−1 is not affected by the hypotheses generated at time instant n. Clearly, the first $N_2-1$ survived symbols values may vary by the next iterations thus the values of these symbols are used only for branch metric and score calculations that are used to select the new survivors. As the survivor number is limited (e.g., M survivors) it is desirable to increase the diversity among them on the symbol located at index $N_2-1$. Taking the hypotheses using the pure Euclidean distance may result with hypotheses that differ in the first (most recent) $N_2-1$ symbols but share the same symbols at location having index $N_2-1$. This lack of diversity among the hypotheses on the symbol located at index $N_2-1$ increases the probability of CPL and an error event. Therefore, in an example implementation, the hypotheses may be selected using a diversity-distance criteria, that is, a minimum Euclidean distance that is constrained for increased (or even maximum) diversity rather than pure Euclidean distance. In an example implementation, the diversity-distance criteria may be selected to ensure that, for any Q hypotheses (per survivor), there will be Q different symbols located at index $N_2-1$ in case that Q≤M, or M different symbols in case that Q>M. The diversity-distance criteria will increase the occupied volume of the hypotheses that can be used for improved performance as well as to reduce complexity by using fewer hypotheses to occupy similar volume as the Euclidean distance criteria. The diversity-distance criterion may be implemented using a LUT similar to the pure Euclidean distance criteria. The input to the LUT may be a quantized version of the residual signal. The quantization resolution may be smaller than the occupied volume of the hypotheses (i.e., it may be a relatively coarse quantization).

In an example implementation, an additional, or alternative, criteria may be used to ensure that, for any Q hypotheses (per survivor), at least a threshold number of the symbols located at index $N_2-1$ will be equal to the symbol at index $N_2-2$ in the hypothesis of the previous iteration. That is, when generating a hypothesis for a symbol at index $N_2-1$, some preference or bias may be given to the hypothesis that was generated for that symbol in the previous iteration when the symbol was at index $N_2$. The strength of such a bias may depend on the amplitudes of the tap coefficients corresponding to index $N_2-2$. That is, if the tap coefficient corresponding to index $N_2-2$ is very low (and thus very unreliable), then perhaps little or no preference may be given to the hypothesis from the previous iteration, but if the tap coefficient corresponding to index $N_2-2$ is relatively high (and thus relatively reliable), then more preference may be given to the hypothesis from the previous iteration.

The sequence estimation uses the paths score that are updated by the branch metric as described with reference to equations 1,2,3. The path score uses the first $N_p$ symbols per path. Therefore, the branch metrics and scores may be regressively recomputed $N_2-1$ times due to the overriding of the first $N_2-1$ symbols of the previous branch vector hypotheses.

In case of high SNR and/or low nonlinear distortion, the variance of the residual signal around the lattice point will be small and a relatively low number of hypotheses may be sufficient to protect against CPL. However, in low SNR and/or high nonlinear distortion conditions, the variance may increase and a relatively-higher number of hypotheses may be needed to sufficiently protect against CPL. Accordingly, the number of hypotheses may be adapted according to the SNR and/or amount of nonlinearity to reduce complexity and power consumption when possible.

Figure 7:
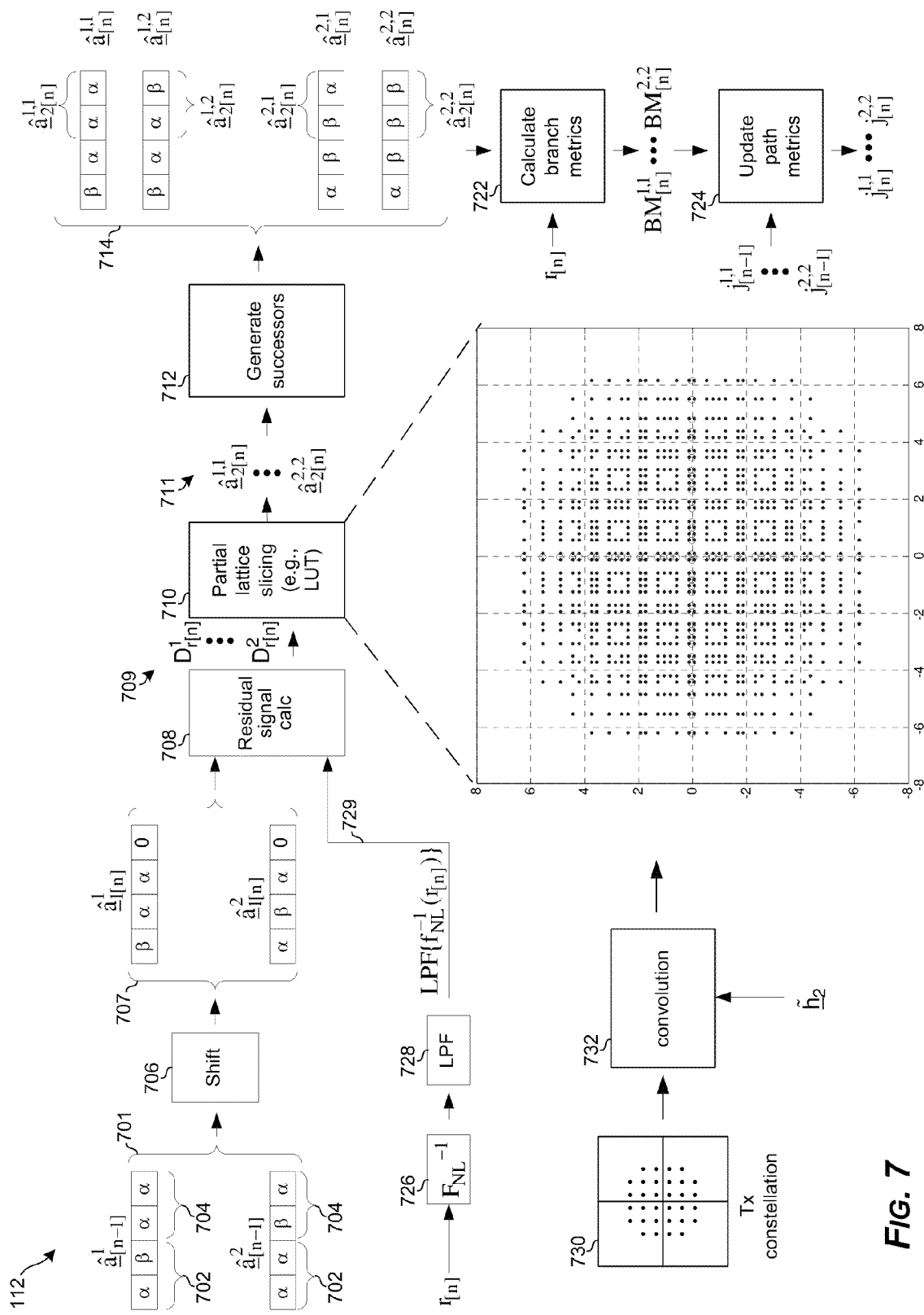
FIG. 7 depicts operations of an example implementation of the sequence estimation circuit of FIG. 1.

FIG. 7 depicts operations of an example implementation of the sequence estimation circuit of FIG. 1. In the example implementation shown, M=2, Q=2, and $N_2$=2. In the example implementation shown, the sequence estimation circuit 112 comprises circuit 706 for implementing a shift operation, circuit 70 for implementing a residual signal calculation operation, circuit 710 for implementing a partial lattice slicing operation, circuit 710 for generating successors based on the survivors from the previous iteration and based on the hypotheses generated by the slicing, circuit 722 for calculating branch metric for the successors, circuit 724 for updating path metrics based on the previous path metrics and the calculated branch metrics, circuit 726 for performing applying the inverse nonlinear model to the current sample of the received signal 117, circuit 728 for low pass filtering the output of circuit 726, and circuit 732 for performing a convolution.

In operation, the symbol constellation 730 used by the transmitter 100 for generating the signal 115 (received by the receiver 108 as signal 117) is convolved with $\tilde{h}_2$ to generate the partial lattice. For the example of 32-QAM, the convolution may result in the partial lattice of FIG. 5 (reproduced in FIG. 7). The symbol survivors from the previous iteration are collectively referenced as 701. Each of the survivors comprises a first portion 702 (e.g., symbols locations with indexes from $N_p$ to $N_2$) which are final and not subject to being overridden, and a second portion 704 (e.g., symbol locations with indexes from $N_2-1$ to 0) which correspond to hypotheses of a previous iterations and are subject to being overridden.

The survivors 701 are shifted by circuit 706 resulting in M vectors 707 which are a first input to the circuit 708. In the example implementation depicted, the symbols in the first two locations (indexes $N_2-1$ and 0) are "don't cares" after the shift, since they are not needed for calculation of the residual signal values. For practical purposes, a symbol from the previous hypothesis may remain in location with index $N_2-1$ and a zero may be inserted into location with index 0 until they are overridden by a newly generated hypothesis.

The current sample of the received signal is operated on by the circuits 726 and 728 resulting in signal 729 which is a second input to the circuit 708. The circuit 708 calculates M residual signal values $D^1_{r[n]} \ldots D_{r[n]}$ (reference designator 709) based on the vectors 707 and the signal 729. Each of the residual signal values is then sliced by circuit 710 to generate M*Q hypotheses 711. In an example implementation, the circuit 710 comprises a memory storing a look-up table indexed by values of $D_x$. For each of the residual signal values, the circuit 710 may determine the Q values of $D_x$ that are closest to residual signal value (e.g., based on a diversity-distance criteria), and retrieve the corresponding Q branch vector hypotheses. The hypotheses are output to circuit 712 which duplicates each of the vectors 707 Q-1 times and then inserts the Q hypothesis into the most-recent $N_2$ symbols of the vector, resulting in M*Q successors (called out as 714). Circuit 722 then calculates a branch metric (e.g., according to expression (2) above) for each of the M*Q successors. The branch metrics are output to circuit 724 which updates the path metrics (e.g., according to expression (3)) above. The M successors having the best path metrics are selected to be the survivors for the next iteration (i.e., for estimating same $r_{[n+1]}$). The survivor having the best path score may thus represent the best estimate of the transmitted symbol sequence corresponding to the received sample r[n]. One or more symbols of the best survivor may accordingly be output by the sequence estimation circuit 112 (e.g., output to FEC decoder 114) as an estimate of a transmitted symbol. For example, at time n, the symbol at index $N_2-1$ of the best survivor may be output as the estimate of the symbol transmitted by transmitter 100 at time $n-N_{2\_1}-\Delta$, where $\Delta$ is the delay, in symbol times, between a symbol being transmitted by transmitter 100 and the corresponding signal being sampled by receiver 108. The output may be a hard decision or a soft-decision (e.g., an LLR). The soft-decision may be weighted based on the location of the residual signal value within the partial lattice (e.g., LLR may indicate increased confidence of a particular symbol value when the residual signal is closer to a boundary of the partial lattice).

In accordance with an example implementation of this disclosure, a sample of PR (Partial Response) signal can be represented by a lattice point that belongs to a full dimension lattice that consists of $M^{N_p}$ points, where M is the symbols constellation (Alphabet) size and $N_p$ is the PR pulse shape filter length (in symbol periods). Assuming that the tap coefficients of the PR filter are designed such that no pair of distinct symbol sequences map to the same lattice point, and assuming perfect reception without AWGN nor other distortion, one can use slicing techniques to decide on $N_p$ information symbols. Clearly this approach is very sensitive to AWGN (and distortion) and it is different from optimal detection methods such as Maximum Likelihood (ML). However this approach may be modified to drive a sequence estimation algorithm and to achieve near ML performance without an exhaustive path search. Slicing $M^{N_p}$ points is very complicated in case of large M and/or $N_p$. Instead of slicing the full dimensional lattice, it is possible to slice part of it which is referred to as a partial lattice. Partial lattice is a lattice which consists of subset of the PR filter taps. Any received sample in a full dimension lattice may be expressed as the inner product of all PR filter taps ($N_p$) with the same number of transmitted symbols. Subtraction of a lower dimensional inner product that consists of $N-N_2$ taps with the respective $N_p-N_2$ symbols yields a residual signal which corresponds to a point of a partial lattice with dimension of $N_2$. The residual signal can be expressed as the inner product of $N_2$ taps and symbols. In an M-algorithm sequence estimation, $N_p$ symbols of each successor path (M successors per survivor) are multiplied by the $N_p$ tap coefficients of the PR filter. Instead of doing that, example implementations of this disclosure may use a partial product to select the most probable hypotheses per survivor. In such an implementation, $N_p-N_2$ survivor symbols, typically, excluding the $N_2$ most recent symbols, are multiplied with the respective $N_p-N_2$ PR filter tap coefficients. Subtracting the product from the received signal results in a residual signal that can be represented as a point of the partial lattice with dimension of $N_2$. Now, the residual signal can be sliced (with a LUT or arithmetically) to provide $N_2$ symbols which are in fact the most probable symbols of the residual signal. However, the most probable hypothesis that relies on received samples at time instant n may not be the correct one, and the correct hypothesis may be detected with some delay, at time instant n+k (k>0). Therefore, it is suggested to use additional hypotheses that are represented by points of the partial lattice which lie around the most probable one and to use them for generating the successors instead of the full search based on M successors per survivor. This approach significantly reduces complexity relative to M-algorithm approach when M is large.

In accordance with an example implementation of this disclosure, a sequence estimation circuit (e.g., 112) of a receiver (e.g., 108) may receive a sample of an inter-symbol correlated (ISC) signal (e.g., $r_{[n]}$ FIG. 7) corresponding to a time instant when phase and/or amplitude of the ISC signal is a result of correlation among a plurality of symbols of a transmitted symbol sequence. The sequence estimation circuit may calculate a residual signal value (e.g., 709) based on the sample of the ISC signal and based on a survivor sequence. The sequence estimation circuit may generate a one or more branch vector hypotheses (e.g., 711) based on the residual signal value, where each of the hypotheses comprises a plurality of symbols. The sequence estimation circuit may generate an estimate of one or more of the plurality of transmitted symbols based on the one or more branch vector hypotheses. The sequence estimation circuit may linearize (e.g., via circuit 726) the sample of said ISO signal. The linearization may comprise applying an estimate of an inverse of a non-linear model. The non-linear model may be a model of nonlinearity experienced by the ISO signal in one or more of: a transmitter from which the ISO signal originated (e.g., transmitter 100), a channel through which the ISO passed en route to the sequence estimation circuit (e.g., channel 116); and a front-end of the receiver (e.g., 110). The sequence estimation circuit may be configured to filter (e.g., via filter 728) the linearized sample. The sequence estimation circuit may be configured to generate the one or more branch vector hypotheses using a multidimensional partial lattice (e.g., lattice of FIG. 5). The multidimensional partial lattice may be based on a symbol constellation used to generate the transmitted symbols, and a subset of tap coefficients (e.g., $\underline{\tilde{h}}_1$ and $\underline{\tilde{h}}_2$) of a filter that models a composite response experienced by the transmitted symbols en route to the sequence estimation circuit. Each of the one or more branch vector hypotheses may comprise $N_p$ symbols, where $N_p$ is a positive integer. The symbol constellation may comprises M symbols, where M is an integer greater than 1 (e.g., 32-QAM). A quantity of branch vectors hypotheses in the one or more branch vector hypotheses may be less than $M^{N_p}$.

A quantity of branch vectors hypotheses in the one or more branch vector hypotheses may be determined (e.g., in real-time) per sample of the received ISO signal such that different quantities of branch vectors hypotheses may be generated for consecutive samples of the received ISO signal. For example, a larger quantity may be used for a sample corresponding to a residual signal value that is relatively close (e.g., within a determined Euclidean distance $D_E$) to the center of the multidimensional partial lattice and a smaller quantity may be used for a sample corresponding to a residual signal value that is relatively far (e.g., not within the determined Euclidean distance $D_E$) from the center of the multidimensional partial lattice. As another example, a larger quantity may be used for samples having a relatively low signal-to-noise ratio (e.g., below a determined threshold SNR $Th_{SNR}$) and a smaller quantity may be used for samples having a relatively high signal-to-noise ratio (e.g., above the determined threshold SNR $Th_{SNR}$). As another example, a larger quantity may be used for samples experiencing relatively large amounts of nonlinear distortion (e.g., above a determined threshold distortion $Th_{NL}$) and a smaller quantity may be used for samples experiencing relatively small amounts of nonlinear distortion (e.g., below the determined threshold distortion $Th_{NL}$).

The ISC signal may comprise a single-carrier or multiple orthogonal frequency division multiplexed (OFDM) carriers. The transmitted symbol sequence may have been transmitted in accordance with a regulatory spectral mask (e.g., set forth by the FCC or ETSI). The one or more of the branch vector hypotheses may be used to extend a survivor vector, wherein, as part of the extension of the survivor vector, one or more symbols of the survivor vector corresponding to a previous branch vector hypothesis (e.g., symbol at $N_2-1$) is overridden by one or more of the plurality of symbols of the one or more of the branch vector.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

What is claimed is:
1. A system comprising:
    a front end circuit operable to receive a sample of an inter-symbol correlated (ISC) signal, said sample corresponding to a time instant when phase and/or amplitude of said ISC signal is a result of correlation among a plurality of symbols of a transmitted symbol sequence; and
    a sequence estimation circuit operable to:
        linearize said sample of said ISC signal;
        calculate a residual signal value based on said linearized sample and based on a survivor sequence; and
        generate one or more decisions for of one or more of said plurality of transmitted symbols based on said residual signal value.
2. The system of claim 1, comprising nonlinearity modeling circuitry, wherein:
    said linearization comprises application of an estimate of an inverse of a non-linear model generated by said nonlinearity modeling circuitry; and
    said non-linear model is a model of nonlinearity experienced by said ISC signal in one or more of:
        a transmitter from which said ISC signal originated;
        a channel through which said ISC signal passed en route to said sequence estimation circuit; and
        a front-end of a receiver.
3. The system of claim 1, wherein each of said one or more decisions for one or more of said plurality of transmitted symbols is a hard decision.

4. The system of claim 1, wherein:
each of said one or more decisions for one or more of said plurality of transmitted symbols is a soft-decision; and
said soft decision is weighted based on said residual signal value.

5. The system of claim 1, wherein said one or more symbols of said transmitted symbol sequence are N-QAM symbols and N is an integer.

6. The system of claim 1, wherein said generation of said one or more decisions is based on a multidimensional partial lattice.

7. The system of claim 2, wherein said sequence estimation circuit is configured to, subsequent to said linearization and prior to said calculation of said residual signal value, filter said sample of said ISC signal.

8. The system of claim 6, wherein said multidimensional partial lattice is based on:
 a symbol constellation used to generate said transmitted symbol sequence; and
 a subset of tap coefficients of a filter that models a composite response experienced by said transmitted symbol sequence en route to said sequence estimation circuit.

9. A system comprising:
 a front end circuit operable to receive a sample of an inter-symbol correlated (ISC) signal, said sample corresponding to a time instant when phase and/or amplitude of said ISC signal is a result of correlation among a plurality of symbols of a transmitted symbol sequence; and
 a sequence estimation circuit operable to:
  calculate a residual signal value based on said sample and based on a survivor sequence;
  generate one or more branch vector hypotheses based on said residual signal value, wherein:
   each of said one or more branch vector hypotheses comprising a plurality of symbols; and
   a quantity of branch vectors hypotheses in said one or more branch vector hypotheses is determined per sample of said ISC signal such that different quantities of branch vectors hypotheses may be generated for consecutive samples of said ISC signal; and
  generate an estimate of one or more of said plurality of symbols or said transmitted symbol sequence based on said one or more branch vector hypotheses.

10. The system of claim 9, wherein:
said quantity of branch vector hypotheses is a first quantity for a sample of said ISC signal corresponding to a residual signal value that is a first distance from a center of a lattice;
said quantity of branch vector hypotheses is a second quantity for a sample of said ISC signal corresponding to a residual signal value that is a second distance from said center of said multidimensional partial lattice;
said first quantity is greater than said second quantity; and
said first distance is greater than said second distance.

11. The system of claim 9, wherein said quantity of branch vector hypotheses in said one or more branch vector hypotheses is determined based on a signal-to-noise ratio.

12. The system of claim 9, wherein said quantity of branch vector hypotheses in said one or more branch vector hypotheses is determined based on an amount of non-linear distortion experienced by said ISC signal.

13. The system of claim 9, wherein:
said estimate of said one or more of said plurality of symbols of said transmitted symbol sequence is a soft-decision; and
said soft decision is weighted based on said residual signal value.

14. The system of claim 9, wherein said plurality of symbols of said transmitted symbol sequence are N-QAM symbols and N is an integer.

15. The system of claim 9, wherein said generation of said estimate is based on a multidimensional partial lattice.

16. The system of claim 15, wherein said multidimensional partial lattice is based on:
 a symbol constellation used to generate said transmitted symbol sequence; and
 a subset of tap coefficients of a filter that models a composite response experienced by said transmitted symbol sequence en route to said sequence estimation circuit.

* * * * *